United States Patent [19]

Viktorov et al.

[11] 4,058,138
[45] Nov. 15, 1977

[54] STRAIGHTWAY VALVE

[76] Inventors: Evgeny Vasilievich Viktorov, ulitsa Tambovskaya, 8, kv. 12; Igor Ivanovich Novikov, ulitsa Bela-Kuna, 22, korpus 1, kv. 31; Tatyana Fedorovna Kondratieva, Sytninskaya ploschad, 3, kv. 16; Georgy Vasilievich Gubarev, prospekt Veteranov, 55, kv. 240; Margarita Sergeevna Yamschikova, Nevsky prospekt, 147, kv. 56, all of Leningrad; Vasily Dmitrievich Vasiliev, ulitsa Gorkogo, 45, kv. 7, Sumy; Georgy Mikhailovich Kontsevich, prospekt K. Marxa, 1, kv. 12, Sumy; Anatoly Sergeevich Gubinsky, prospekt K.Marxa, 23, kv. 55, Sumy; Anatoly Alexeevich Velikasov, ulitsa Novomestenskaya, 25, kv. 18, Sumy; Vladimir Ignatievich Taradonov, ulitsa Gazety "Pravda", 34, kv. 78, Sumy; Valery Pavlovich Isakov, prospekt Metallistov, 80, korpus 3, kv. 251, Leningrad, all of U.S.S.R.

[21] Appl. No.: 604,078

[22] Filed: Aug. 12, 1975

[51] Int. Cl.² .............................................. F16K 15/14
[52] U.S. Cl. ................................... 137/512.1; 137/856
[58] Field of Search .............. 137/512.1, 512.15, 525.3

[56] References Cited

U.S. PATENT DOCUMENTS

| 1,632,385 | 6/1927 | Vollman | 137/512.1 |
| 2,378,613 | 6/1945 | Young et al. | 137/525.3 |
| 2,934,083 | 4/1960 | Norton | 137/512.1 X |
| 3,370,786 | 2/1968 | Brown | 137/512.15 X |

FOREIGN PATENT DOCUMENTS

| 60,774 | 3/1943 | Denmark | 137/512.1 |
| 606,936 | 7/1960 | Italy | 137/525.3 |
| 182,837 | 6/1966 | U.S.S.R. | 137/512.1 |

Primary Examiner—Robert G. Nilson

[57] ABSTRACT

A straightway valve comprising a body with a through hole accommodating a coaxially mounted sleeve. The sleeve is secured to the body at the side where a working fluid is admitted into the sleeve. The sleeve is arranged so that there is a passage between its external surface and the internal surface of the body. The side surface of the sleeve is provided with ports for communicating the sleeve with the passage for the working fluid.

Each port is closed by a flexible plate cantilevered to the external surface of the sleeve. The flexible plate has a variable width decreasing towards the point of its fastening to the sleeve so that the ratio of the port-closing portion of the plate to the width of its remaining flexible portion is 8:1.1.

3 Claims, 6 Drawing Figures

STRAIGHTWAY VALVE

The present invention relates to devices for complete or partial closing of a hole communicating two spaces and more particularly it relates to straightway valves.

The present invention can be used to best advantage in compressors and positive-displacement pumps, particularly in reciprocating compressors.

Known in the art is a straightway valve covered by the Author's Certificate No. 182,837, USSR. The known straightway valve is intended for use in reciprocating compressors. It has a body, e.g. in the form of a plate with one or more through holes. The longitudinal axis of each hole is parallel to the longitudinal axis of the plate. Installed coaxially inside is a polyhedral sleeve. The latter is secured on the body at the side where the working fluid is admitted into the sleeve and is installed in such a manner as to form a passage for the working fluid between the external surface of the sleeve and the internal surface of the body. Ports made on the side surface of the sleeve put the sleeve space in communication with the passage for the working fluid. Each port is closed by a flexible plate cantilevered to the external surface of the sleeve. The flexible plate is a single-piece part of the same width and thickness throughout its length. The ports for the discharge of the working fluid into the passage are set at an angle to the longitudinal axis of the sleeve. When the valve is closed, the plates close the sleeve ports.

In the course of valve operation the working fluid enters the sleeve, forces off the flexible plates and passes through the ports on the side surface of the sleeve into the passage wherefrom it flows into the compressor cylinder or into a pipeline. The surface of the body has the shape of a polyhedron at the side facing the ports in the sleeve. When the valve is wide open, the flexible plate is pressed against the face of the body polyhedron. This face limits the plate travel. The flow of the working fluid through the valve creates a gas-dynamic resistance which causes losses of energy in the valve whereby compressor economy is impaired. The major proportion of the gas-dynamic resistance is created by the cross-sectional area of the outlet gap between the plate and the seat, i.e. by the surface around each port in the sleeve closed by the plate. Therefore the major prerequisite for increasing the valve capacity and thus reducing the energy losses in the valve is to increase the passage area through the outlet opening which is accomplished by increasing the valve lift.

On the other hand, there is a tendency to reduce the plate lift in order to prolong the life of the plates subjected to cyclic impact loads. This limits the speed of plate motions, and reduces the stress in the plate at the moment when it strikes the seat and the limiting surface of the body.

The lift of the plate depends on their stiffness. An excessively stiff plate comes short of the face of the body polyhedron which diminishes the cross-sectional area of the opening and increases the resistance of the valve. This sets the plate in vibration thus aggravating the danger of its breaking. The stiffness and the bending force of the plate depend on the width, thickness and length of its cantilevered portion.

The flexible plate of the known straightway valve has a uniform width and thickness throughout its length.

The thickness of the plates is selected so as to ensure their strength. When the valve is closed, the portion of the plate closing the ports is subjected to bending stresses caused by a great difference of the static pressures before and behind the valve, acting on both sides of the plate. This stress is inversely proportional to the squared thickness of the plate and directly proportional to the squared width of the port in the sleeve. When the valve is open, the bending stresses in the plate at the point of its attachment are directly proportional to its thickness. The stiffness of the flexible plate and the force required for pressing it off are proportional to the width of the plate and its cubed thickness. Therefore in the known valve the flexible plate of uniform width and thickness in length is very stiff. This results in incomplete opening of the valve which, in turn, reduces the rate of fluid flow through the valve and the overall economy of the compressor while the vibration of plates curtails their service life and impairs the reliability of the compressor. The stiffness of the plate can be reduced, for example, by increasing its length though it is impracticable since it increases considerably the "dead space" of the valve and cuts down compressor efficiency. Here and hereinafter the term "dead space" should be understood as that portion of the valve space which is filled with the working fluid and communicates with the compressor when the valve is closed.

The area through the gap at the side edges of the plates in the known valve is not used sufficiently well because the passage between the internal surface of the body and the external surface of the sleeve is small and offers a high resistance. Efficient functioning of the area through the gap is observed only at the face edge of the plate. This reduces the valve capacity and compressor economy.

The above disadvantages of the known valve call for the use of a larger number of valves and for increasing their length and, consequently, the size of the valve as a whole which also increases the "dead space" of the cylinder, reduces compressor efficiency, raises the manufacturing cost of the valves and of the compressor, and limits the use of the valve to a certain speed of the compressor crankshaft.

Besides, the known valve cannot be utilized at high pressures since this calls for very thick plates whose high stiffness is incompatible with efficient employment of the valve.

An object of the present invention is to promote economy of the valve by reducing th stiffness of the plate and the gas-dynamic resistance created by the valve which enables the valve to be used within a wide range of compressor crankshaft speeds.

Another object of the present invention is to increase the reliability of the valve by extending the service life of its flexible plates.

Still another object of the present invention is to widen the range of valve operating pressures.

In accordance with these and other objects of the present invention consists in providing a straightway valve comprising a body with a through hole accommodating a coaxially mounted sleeve which is secured to the body at the working fluid inlet side so as to form a passage between the external surface of the sleeve and the internal surface of the body, the passage communicating with the inside space of the sleeve through the ports on its side surface. Each port is closed by a flexible plate cantilevered to the external surface of the sleeve. According to the invention, the flexible plate has a variable width decreasing towards the point of its fastening to the sleeve so that the ratio of the width of the port-closing portion of the plate to the width of its other elastic portion is 8 : 1.1.

Such an arrangement reduces the stiffness of the plate and the force required for its complete pressing-off because the stiffness and the force are directly proportional to the width of the elastic portion of the plate. This ensures also the requisite strength of the plate due to a reduction in the stress caused by the thickness in the port-closing and elastic portions of the plate. The flexible plate according to the invention ensures complete opening of the valve used in the cylinders of compressors working within a wide range of pressures and crankshaft speeds.

Full opening of the valve reduces its gas-dynamic resistance, thus increasing the rate of flow of the working fluid through the value and promoting compressor economy. Besides, full opening of the valve rules out the vibration of plates, which increases their life and the reliability of the compressor.

When the width of the flexible plate changes along its length, this changes the plate stiffness so that such a valve can be used at various pressures and crankshaft speeds.

It is recommended that the flexible plate has a varying thickness decreasing towards the point of its fastening to the sleeve so that the ratio of the thickness of the port-closing portion of the plate to the thickness of its remaining elastic portion would be 3:1.

If the thickness of the flexible plate varies throughout the plate length this reduces still further the plate stiffness, the gas-dynamic resistance of the valve, wards off the vibration of the plates and thus promotes the economy and reliability of the compressor.

The decreasing thickness of the plate in the direction of the point of its fastening reduces considerably the bending stress at the point of fastening during the plate opening because this stress in proportional to the plate thickness. The bending stress caused by the static pressures in the port-closing portion of the flexible plate is considerably decreased too. The lower stresses in the plate prolong its life and raise the compressor reliability. This allows the valves to be used at higher compressor crankshaft speeds and at considerably higher pressures (up to 500 kgf/cm$^2$) than it is possible with the plates of uniform thickness in length.

It is universally known that the stiffness and bending stress of the flexible plate decrease not only with a reduction in the plate width and thickness but also with an increase in the length of its cantilevered portion. In case of a variable width and thickness, the stiffness of the plate is sufficiently reduced and its length can be decreased. Therefore the length of the plate and the height of the sleeve and, as a consequence, of the entire valve is smaller than that of the valve whose flexible plate is of uniform width and thickness in length. A smaller height of the valve reduces its "dead space" and steps up compressor efficiency.

It is advisable that the elastic portion of the flexible plate has at least one hole.

This also reduces the stiffness of the flexible plate and the force required for its complete opening. Complete opening of the plate reduces the gas-dynamic resistance of the valve and increases compressor economy. Such a plate can be used most successfully with large-size ports for the discharge of the working fluid from the sleeve.

The straightway valves according to the invention installed on a two-stage 10 m$^3$/min air compressor with a delivery pressure of 8 atm gauge, a shaft speed of 750 rpm and a mean piston speed of 5 m/s have been used under actual service conditions within a period of over 15000 hours and go on working without failure and replacement of the plates, in which the ratio of the width of the port-closing portion to the width of their elastic portion is equal to 3:1.

The specific power input of the compressor equipped with straightway valves according to the invention has been reduced by 6.3% as compared with the compressors equipped with known straightway valves.

Other objects and advantages of the invention will become apparent from the examples of its realization and from the drawings in which.

Figure 1:
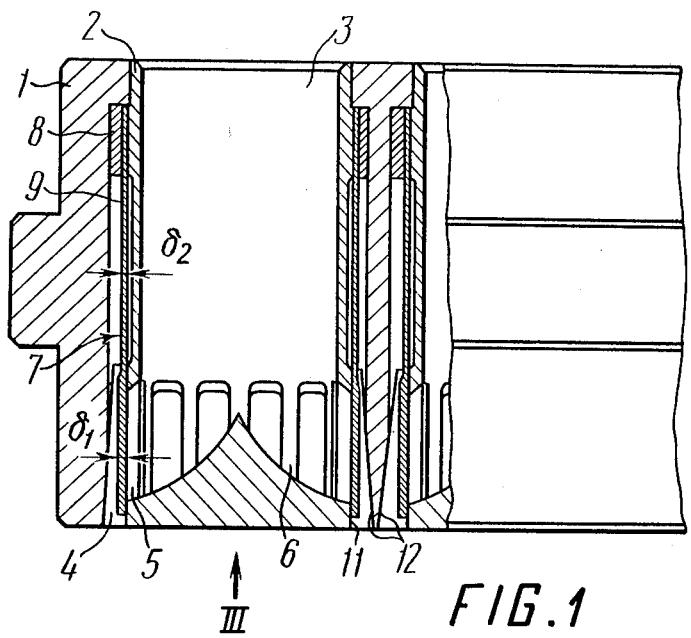
FIG. 1 is a longitudinal section through the straightway valve according to the invention.

The straightway valve according to the invention is intended for installation in a plate mounted on the cylinder of a reciprocating compressor, e.g. a high-capacity one.

The straightway valve comprises a body 1 (FIG. 1) which constitutes a part of a plate provided with one or more through holes. The valve body may take the form of an individual part installed in the hole of the plate (not shown in the drawing). Installed coaxially with the hole is a sleeve 2 which is pressed into the body 1 at the side where the working fluid enters the space 3 of a sleeve 2. The sleeve 2 is installed so as to form a passage 4 between its external surface and the internal surface of the body 1. The side surface of the sleeve 2 has ports 5 for the discharge of the working fluid from the space 3 of the sleeve 2 into the passage 4 wherefrom the working fluid enters the compressor cylinder (not shown in the drawing).

Ports 5 are preferably set at an angle to the longitudinal axis of the sleeve 2. Each port 5 has a connector 6 and is closed by a flexible plate 7 which is cantilivered to the external surface of the sleeve 2 with the aid of a ring 8. The ring 8 is fitted with interference on the sleeve 2 with the plates 7. The connector 6 supports the plate 7 when the valve is closed. The flexible plate 7 has a variable thickness decreasing towards the point where the plate is fastened to the sleeve 2 so that the ratio of the thickness $\delta_1$ of the plate 7 where it closes the port 5 to the thickness $\delta_2$ of another, elastic portion 9 of the plate 7 is 3:1.

Figures 2, 4:
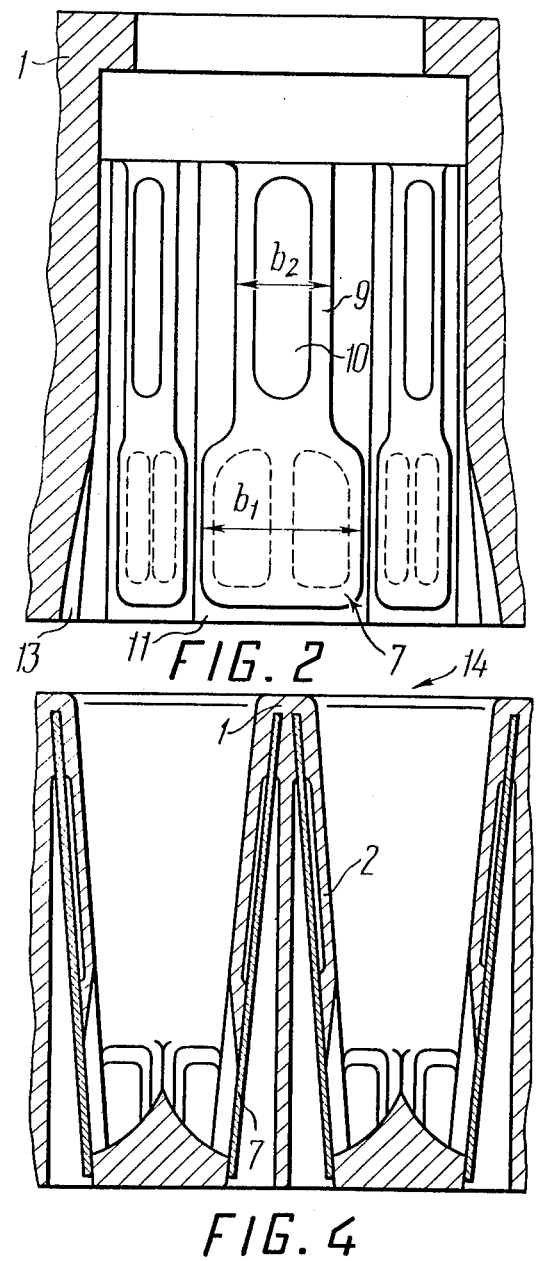
FIG. 2 is a partial fragmentary view of FIG. 1 looking from the outside of the valve body with portions of the assembly omitted for clarity's sake.
FIG. 4 shows another version of the valve according to the invention.

Besides, the plate 7 has a variable width (see FIG. 2) decreasing towards the point of its fastening to the sleeve 2 so that the ratio of the width $b_1$ of the plate 7 closing the port 5 for the passage of the working fluid to the width $b_2$ of the remaining elastic portion 9 of the plate 7 is 8:1.1.

Figure 3:
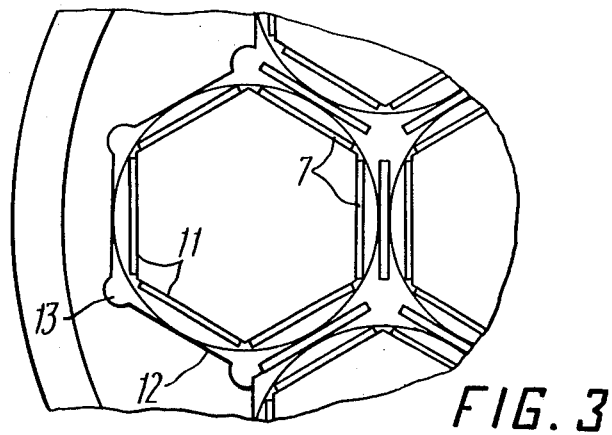
FIG. 3 is a view along arrow III.

The portion 9 of the plate 7 has a hole 10 which reduces the stiffness of the plate 7 and the force required for its complete opening. The external surface of the sleeve 2 in the zone of the ports 5 has the shape of a polyhedron as can be seen in FIG. 3. When the valve is closed, the plate 7 rests on faces 11 of the sleeve 2 and closes the ports 5 (FIG. 1).

The internal surface of the body 1 in the zone where the latter fits around the polyhedron of the sleeve 2 has the shape of a truncated pyramid, the profile of the face 12 corresponding, say, to the line of deflection of the plate 7. When the valve is wide open, each flexible plate is pressed against the face 12 which limits its travel. The bottom of the sleeve 2 has the form of a splitter. Additional channels 13 (FIG. 3) for the discharge of the working fluid are made on the internal surface of the body 1 for reducing the resistance of the valve.

The valve according to the invention functions as follows. During the suction stroke the gas enters from the suction manifold (not shown in the drawing) into the space 3 (FIG. 1) of the sleeve 2 and flows out through the side port 5, pressing off the flexible plates 7. The working fluid flowing from under the side edges of the plates 7 is discharged through the additional channels 13 (FIG. 2) in the body 1. Then the working fluid enters the cylinder (not shown in the drawing). During the delivery stroke the working fluid flows in a similar manner from the cylinder into the delivery line.

When the valve is closed, pressure behind the valve is higher then before it so that the portion of the plates 7 closing the ports 5 of the sleeve 2 is subjected to the bending stresses caused by the difference of the static pressures acting on the plate 7 from both sides. This stress is proportional to the squared width of the port 5 in the sleeve 2 and inversely proportional to the squared thickness of the plates 7 in the portion closing the ports 5.

The required strength of the closing portion of the plate 7 is ensured due to the permissible limits of its bending stress which is achieved by selecting the appropriate thickness of the closing portion of the plate 7. Besides, the supporting connectors 6 in the ports 5 of the sleeve 2 also contribute to a reduction of the bending stress in the plate 7 because the width of the plate 7 subjected to bending stress is reduced. The elastic portion 9 of the plate 7 is relived of pressure.

When the valve is open the bending stresses arising in the elastic portion 9 of the plate 7 are proportional to its thickness. Inasmuch as the stiffness of the flexible plate 7 and the force required for its bending are proportional to the width of the plate 7 and to its cubed thickness, this ensures complete opening of the valve. It also reduces the bending stress in the elastic portion 9 of the plate 7.

For cutting down the manufacturing costs and improving the service characteristics, the straightway valve can be made of a monolithic type with removable plates 7. The monolithic valve is a single unit 14 (FIG. 4) in which the body 1 and the sleeves 2 are combined. The absence of parts for fastening the sleeve 2 in the body 1 makes it possible to reduce their height, diminish the "dead space" of the valve, arrange the sleeves 2 closer to each other, and increase the passage area through the valve. The plates 7 of the monolithic valve are secured at the stage of casting or pressing the valve. The plates 7 are replaced by a mechanical method while their subsequent fastening is achieved in the valve when operating in the compressor due to the difference in the coefficients of linear expansion of the metals from which the body 1 and the plates 7 are made.

Figure 5:
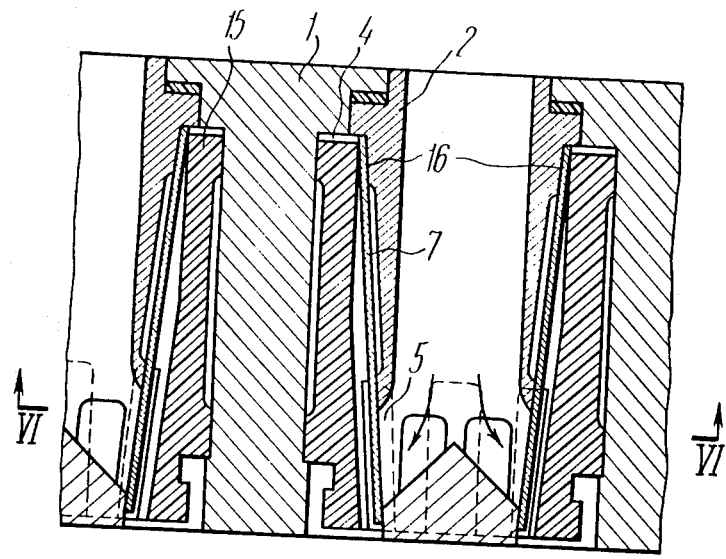
FIG. 5 shows a method of fastening the plate to the surface of the sleeve.

In the examples described above replacement of the plates 7 calls for removing the sleeve 2 from the body 1. However, the plates 7 can be fastened non-rigidly to the sleeve 2. For example, the plate 7 is secured to the external surface of the sleeve 2 by means of a bushing 15 (FIG. 5).

The bushing is made of a flexible material and is polyhedral in shape. The bushing 15 is located in the passage 4 between the internal surface of the body 1 and the external surface of the sleeve 2 so that it does not fit around the entire hight of the sleeve 2. The external surface of the sleeve 2 is provided with flats 16 on which the plates 7 are placed. The bushing 15 is installed in the body 1 with an interference and therefore presses the plates 17 against the flats 16.

Figure 6:
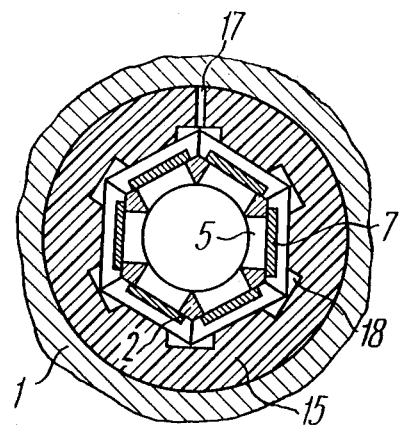
FIG. 6 is a section taken along line VI—VI in FIG. 5.

In the operating valve the bushing 15 becomes heated and presses the plates 7 still stronger against the flats 16. The bushing 15 may have one or more cutouts 17 (FIG. 6) to facilitate installation and removal. Located on the inner surface of the bushing 15 at the height of the ports 5 (FIG. 5) are channels 18 (FIG. 6) for the discharge of the working fluid. The inner surface of the bushing 15 limits the travel of the plates 7. The flexible material from which the bushing 15 is made increases the service life of the plates 7. The channels 18 reduce the gas-dynamic resistance of the valve and increase the flow of the working fluid through the valve.

If the valve is intended for use with a dirt-laden working fluid containing solid inclusions in the form of sand, etc., it is recommend that the internal surface of the body 1 (FIG. 1) be cone-shaped at the point where the body 1 fits around the polyhedron of sleeve 2. The solid particles entering the space between the plate 7 and the cone-shaped surface of the body 1 are concentrated in the segmental section and drop. If the internal surface of the body has faces 12 then, if solid particles enter between the plate 7 and the faces 12, the plate 7 striking the face 12 may break.

We claim:

1. A straightway valve including an inlet and an outlet for a working fluid, and comprising: a body with an internal polyhedral surface; at least one through hole in said body; a sleeve installed coaxially in said hole and secured to said body at the side of said inlet, said sleeve having an external polyhedral surface, defining an inner space, and being installed so as to form a passage between said external surface of the sleeve and said internal surface of the body; ports on the side surface of said sleeve for communicating said inner space with said passage; additional channels for said outlet of the working medium at places of intersection of edges made in said body hole at the level of said ports; flexible plates cantilevered between said body and said sleeve; said plates having port-closing and resilient portions; said plates closing said ports and having a variable width decreasing towards the points of plate fastening to said sleeve so that the ratio of the widths of said port-closing portions to that of said resilient portions is 8:1.1.

2. The straightway valve as defined in claim 1, wherein said plates have a variable thickness decreasing towards said fastening points so that the ratio of the thickness of said port-closing portions for the passage of the working fluid to that of said resilient portions is 3:1.

3. The straightway valve as defined in claim 1, wherein said plates have at least one hole in said resilient portions.

* * * * *